(12) United States Patent
Zhang et al.

(10) Patent No.: US 11,178,669 B2
(45) Date of Patent: Nov. 16, 2021

(54) METHOD FOR INDICATING PDSCH/PUSCH RESOURCE ELEMENT MAPPING

(71) Applicant: QUALCOMM Incorporated, San Diego, CA (US)

(72) Inventors: Yu Zhang, Beijing (CN); Wanshi Chen, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/483,524

(22) PCT Filed: Mar. 15, 2017

(86) PCT No.: PCT/CN2017/076792
§ 371 (c)(1),
(2) Date: Aug. 5, 2019

(87) PCT Pub. No.: WO2018/165911
PCT Pub. Date: Sep. 20, 2018

(65) Prior Publication Data
US 2020/0196316 A1      Jun. 18, 2020

(51) Int. Cl.
| H04W 72/04 | (2009.01) |
| H04L 1/00 | (2006.01) |
| H04L 1/16 | (2006.01) |
| H04L 5/00 | (2006.01) |
| H04L 25/02 | (2006.01) |
| H04W 72/14 | (2009.01) |

(52) U.S. Cl.
CPC ....... *H04W 72/0493* (2013.01); *H04L 1/0026* (2013.01); *H04L 1/1614* (2013.01); *H04L 5/0051* (2013.01); *H04L 5/0073* (2013.01); *H04L 25/0226* (2013.01); *H04W 72/042* (2013.01); *H04W 72/14* (2013.01)

(58) Field of Classification Search
CPC ....................................................... H04L 1/0026
USPC ......................................................... 370/329
See application file for complete search history.

(56) References Cited

U.S. PATENT DOCUMENTS

| 2012/0188955 A1* | 7/2012 | Zhang | H04L 5/005 370/329 |
| 2013/0010720 A1* | 1/2013 | Lohr | H04W 72/0453 370/329 |
| 2013/0083753 A1* | 4/2013 | Lee | H04W 72/0453 370/329 |

(Continued)

FOREIGN PATENT DOCUMENTS

| CN | 104661309 A | 5/2015 |
| WO | 2014075277 A1 | 5/2014 |

(Continued)

OTHER PUBLICATIONS

Fujitsu: "Discussion on PDSCH RE Mapping", 3GPP TSG RAN WG1 #70 R1-1233011 Aug. 17, 2012, 4 pages.

(Continued)

*Primary Examiner* — Peter G Solinsky
(74) *Attorney, Agent, or Firm* — Qualcomm Incorporated

(57) ABSTRACT

Certain aspects of the present disclosure relate to methods and apparatus for indicating resource element (RE) channel mapping using communications systems operating according to new radio (NR) technologies.

54 Claims, 16 Drawing Sheets

(56) References Cited

U.S. PATENT DOCUMENTS

2016/0330004 A1   11/2016  Kim et al.
2017/0208590 A1*  7/2017  Kim et al.
2018/0220462 A1*  8/2018  Kusashima ....... H04W 74/0816
2020/0077427 A1*  3/2020  Li ........................ H04L 5/0091

FOREIGN PATENT DOCUMENTS

WO     2015158111 A1   10/2015
WO     2016182291 A1   11/2016

OTHER PUBLICATIONS

International Search Report and Written Opinion—PCT/CN2017/076792—ISA/EPO—dated Nov. 30, 2017.
Supplementary European Search Report—EP17900659—Search Authority—The Hague—Oct. 19, 2020.

* cited by examiner

Aperiodic ZP CSI-RS indicator for PDSCH rate-matching

UE 1

Potential aperiodic ZP CSI-RS resources configured by RRC

UE 2

Aperiodic NZP CSI-RS for CSI reporting

▨ Periodic NZP CSI-RS for both UEs 1 and 2
☐ ZP CSI-RS resources configured by RRC to UE 1 for PDSCH rate matching
▨ REs indicated by aperiodic ZP CSI-RS field to UE 1
☐ Aperiodic NZP CSI-RS for UE 2

METHOD FOR INDICATING PDSCH/PUSCH RESOURCE ELEMENT MAPPING

This application is a national stage application under 35 U.S.C. 371 of PCT/CN2017/076792, filed Mar. 15, 2017, which is assigned to the assignee of the present application and is expressly incorporated by reference in its entirety.

FIELD

The present disclosure relates generally to communication systems, and more particularly, to methods and apparatus for indicating resource element (RE) channel mapping using communications systems operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving an indication, for one or more subband sets, of one or more resource elements (REs), and performing rate matching around the one or more REs based on the received indication when processing a physical shared data channel.

Certain aspects provide a method for wireless communication by a base station (BS). The method generally includes generating an indication, for one or more subband sets, of one or more resource elements (REs), and transmitting the indication to one or more user equipment (UE) that is configured to perform rate matching around the one or more REs based on the indication when processing a physical shared data channel.

Certain aspects provide a method of wireless communication by a user equipment (UE). The method generally includes receiving an indication, for one or more subband sets, of one or more resource elements (REs) and avoiding mapping a physical uplink shared channel (PUSCH) to the one or more Res based on the received indication.

Certain aspects provide a method of wireless communication by a user equipment (UE). The method generally includes receiving an indication, for one or more subband sets, of one or more resource elements (REs), and avoiding mapping a physical downlink shared channel (PDSCH) to the one or more REs based on the received indication.

Certain aspects provide an apparatus for wireless communication. The apparatus generally includes means for receiving an indication, for one or more subband sets, of one or more resource elements (REs), and means for performing rate matching around the one or more REs based on the received indication when processing a physical shared data channel.

Certain aspects provide an apparatus for wireless communication. The apparatus generally includes means for generating an indication, for one or more subband sets, of one or more resource elements (REs), and means for transmitting the indication to one or more user equipment (UE) that is configured to perform rate matching around the one or more REs based on the indication when processing a physical shared data channel.

Certain aspects provide an apparatus for wireless communication. The apparatus generally includes means for receiving an indication, for one or more subband sets, of one or more resource elements (REs), and means for avoiding mapping a physical uplink shared channel (PUSCH) to the one or more Res based on the received indication.

Certain aspects provide an apparatus for wireless communication. The apparatus generally includes means for receiving an indication, for one or more subband sets, of one or more resource elements (REs), and means for avoiding mapping a physical downlink shared channel (PDSCH) to the one or more REs based on the received indication.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
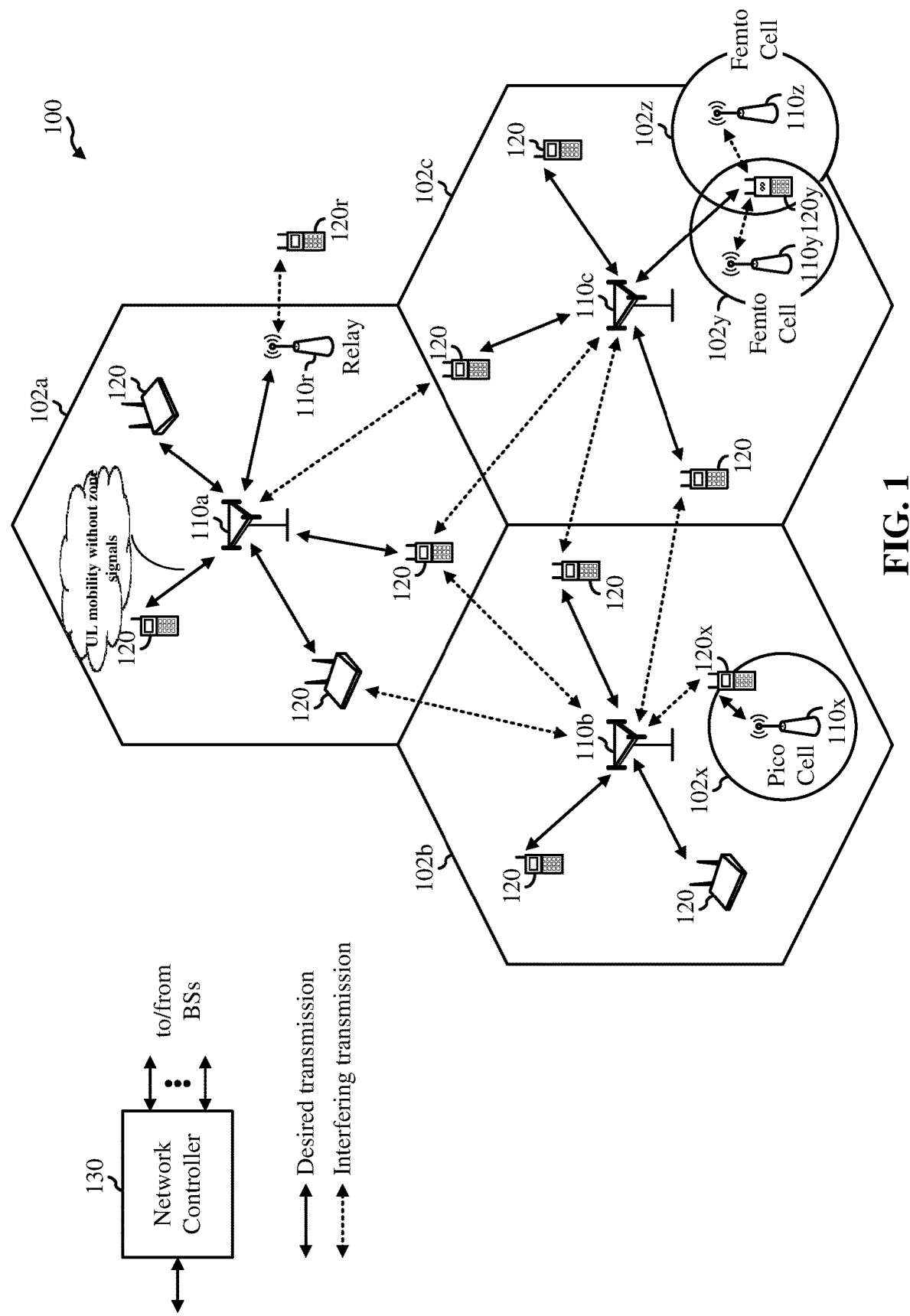
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 10yy and 110z may be femto BS for the femto cells 102v and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
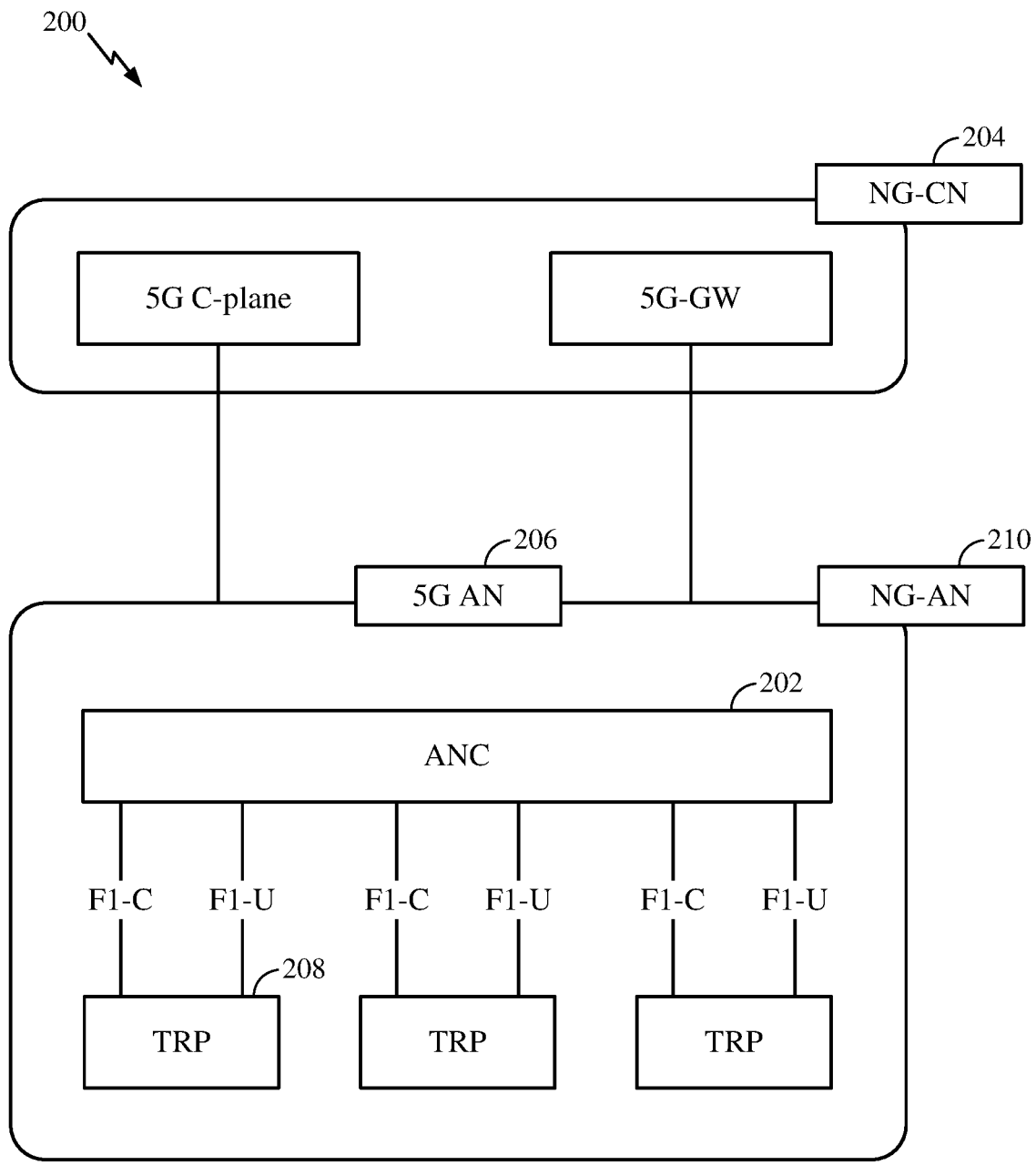
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
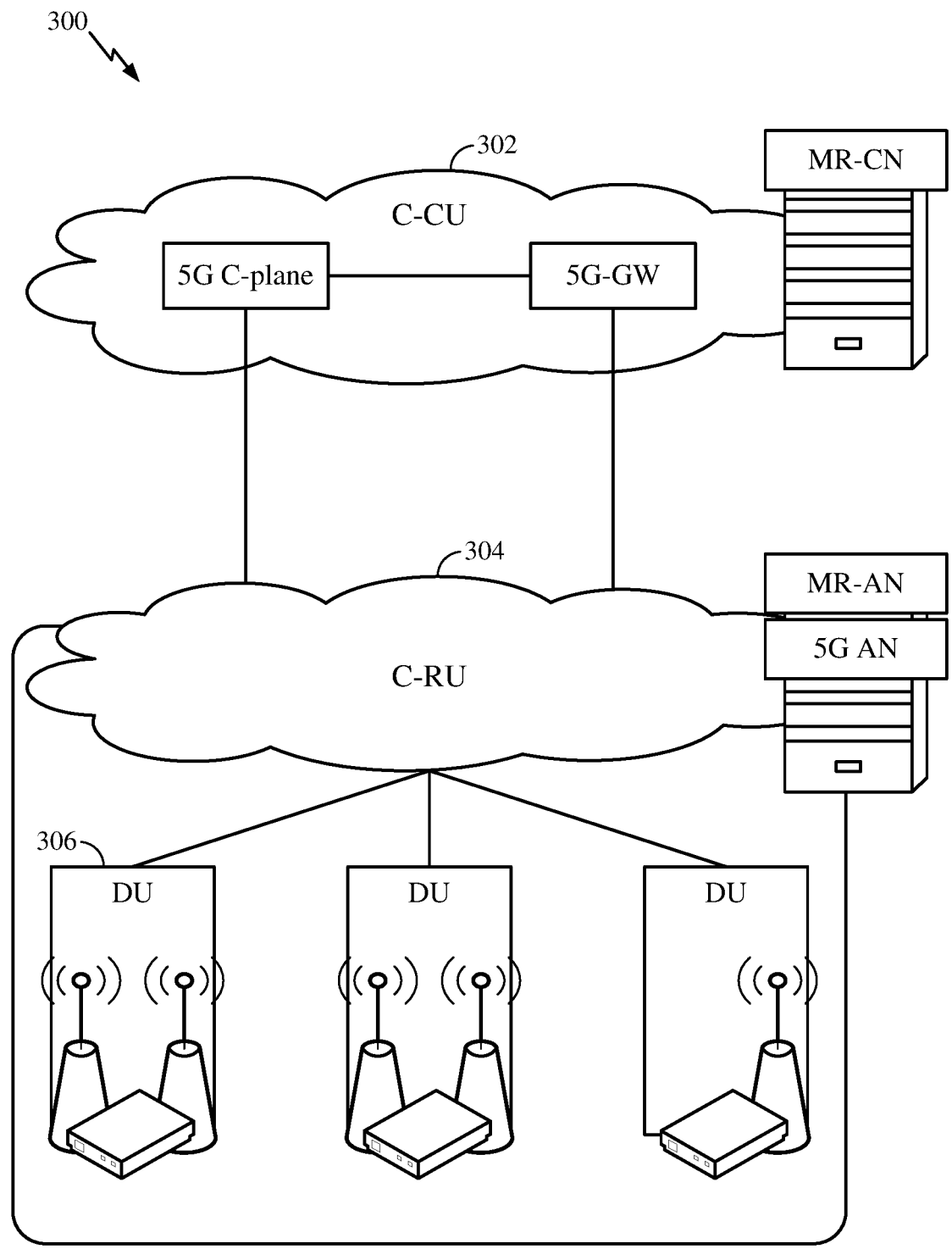
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
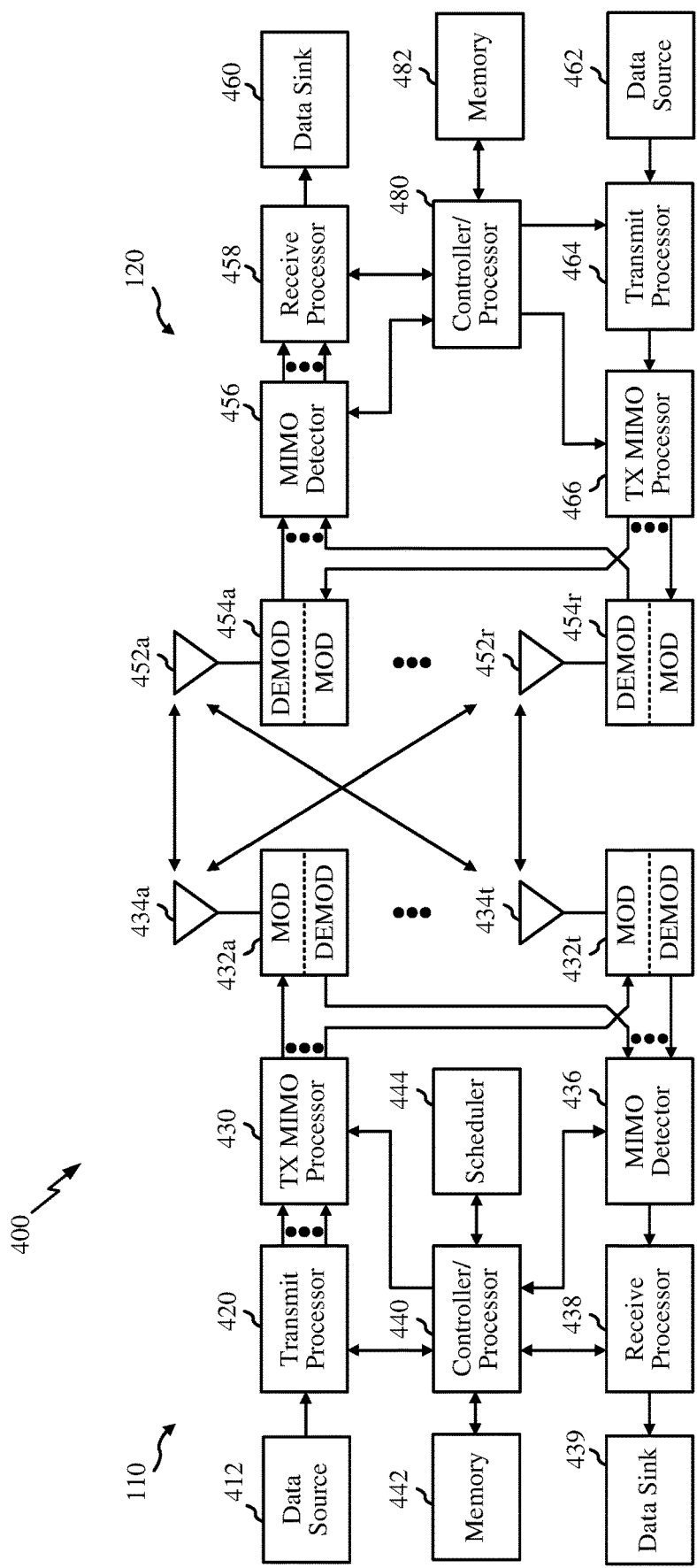
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120v. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
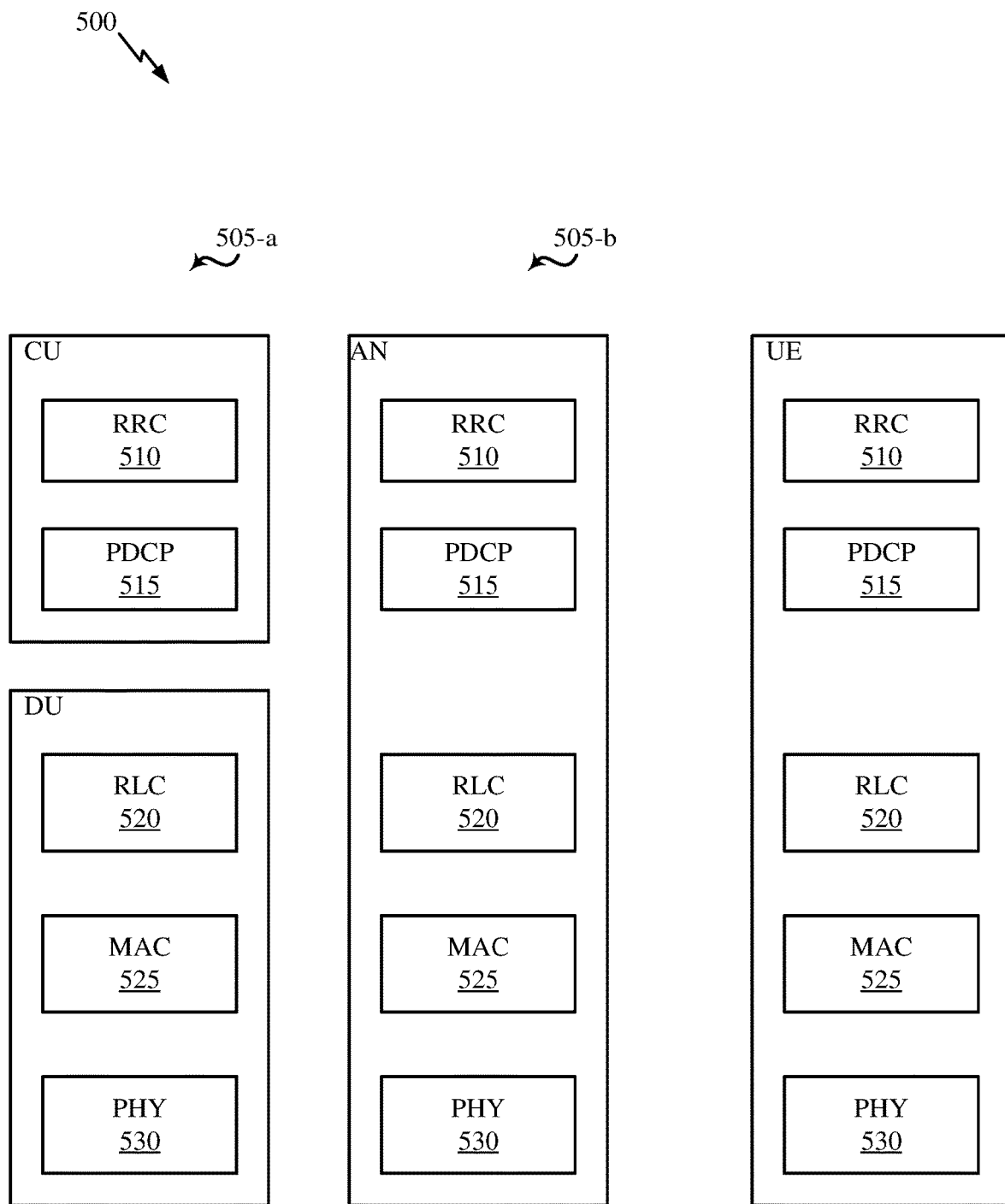
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
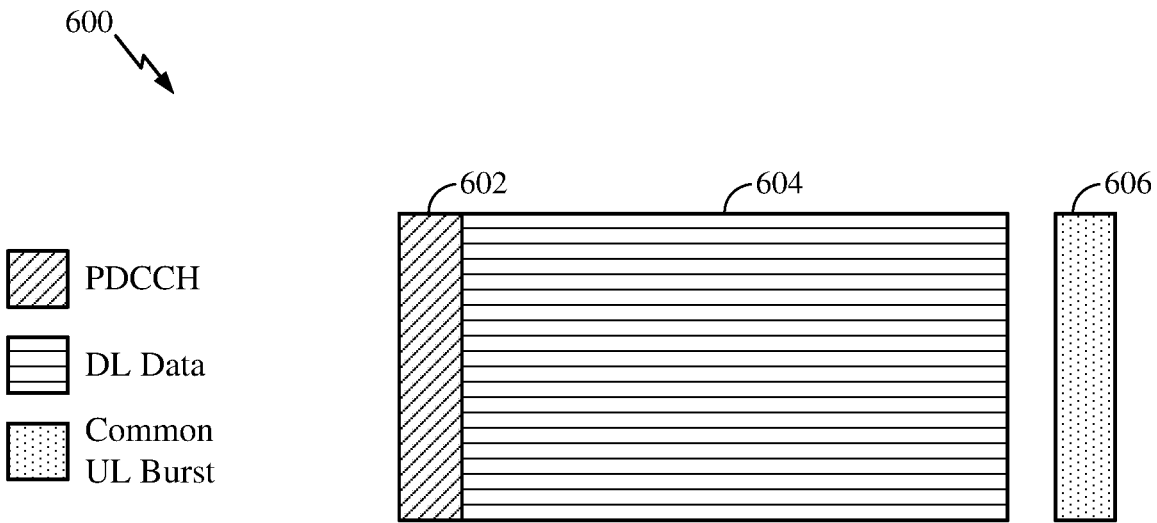
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
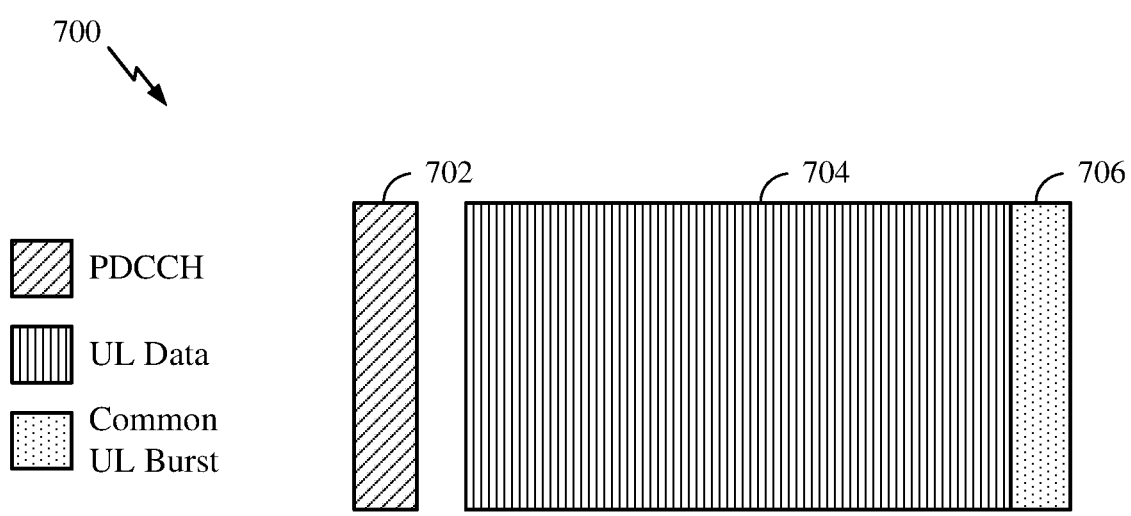
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Resource Element Mapping

Figure 8:
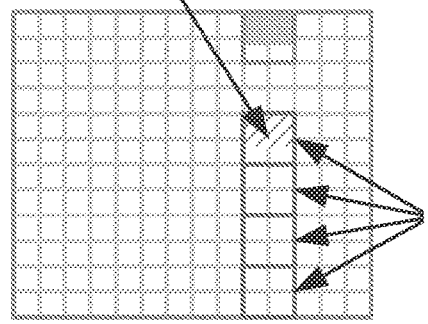
FIG. 8 illustrates an example of data channel mapping in LTE, in accordance with aspects of the present disclosure.
Figure 8:
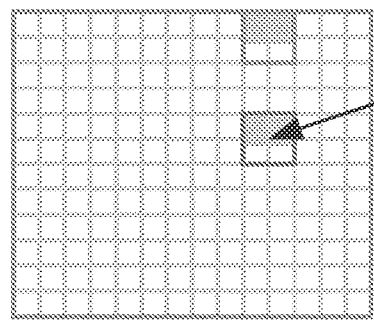

FIG. 8 illustrates an example of data channel mapping in LTE, in accordance with aspects of the present disclosure. Particularly, FIG. 8 includes UE1 and UE2 data channel mapping that includes indication of PDSCH RE mapping in LTE.

The PDSCH mapping to the RB assigned for transmission should avoid the resource elements (REs) used for reference signals (RSs) or used for some control channels. According to one or more cases, some examples of RSs include a cell-specific reference signal (CRS), a non-zero power channel state information reference signal (NZP CSI-RS), and a zero power channel state information reference signal (ZP CSI-RS), etc. Further, the REs that are used for reference signals may be indicated to each UE. For example, REs used as one or more of CRS and NZP CSI-RS may be indicated to a UE via RRC that those REs are not to be considered for data channel mapping (e.g., PDSCH mapping). According to another example, REs used as periodic ZP CSI-RS may be indicated to a UE via RRC (PDSCH-mapping-and-quasi-colocation configuration), and/or DCI (PDSCH-mapping-and-quasi-colocation indicator, a.k.a. PQI). Further, REs used as an aperiodic ZP CSI-RS may be indicated to a UE via DCI. In one or more examples, a 2-bit aperiodic ZP CSI-RS resource signaling field may be provided to indicate RRC configured ZP CSI-RS resources to one or more UEs. According to one or more cases, with LTE CSI-RS may be transmitted across the whole channel bandwidth. Further, wideband aperiodic ZP CSI-RS configuration/indication may be sufficient. In one example, a hybrid of an RRC configuration such as RRC messaging and layer 1 signaling may be used to provide an indication.

Looking back at FIG. 8, both the UE1 and the UE2 specifically show a block of resources that serve as the periodic NZP CSI-RS for both UE1 and UE2. Further, UE1 includes four potential aperiodic ZP CSI-RS resources configured by RRC to UE1 for PDSCH rate matching. That is, to avoid mapping the PDSCH to these REs. Additionally, UE2 includes a specific NZP CSI-RS for CSI reporting. The corresponding REs are indicated by aperiodic ZP CSI RS field to UE1 in the form of an aperiodic ZP SCI-RS indicator for PDSCH rate-matching, as shown.

In NR, the system bandwidth for a carrier can be much larger than that of LTE. For example, in one or more cases, LTE system bandwidth may be up to 20 MHz. In comparison, NR system bandwidth may, in one or more cases, be up to 100 MHz for sub-6 GHz carrier frequency, and for higher carrier frequency NR system bandwidth may be up to 1 GHz.

Figure 9:
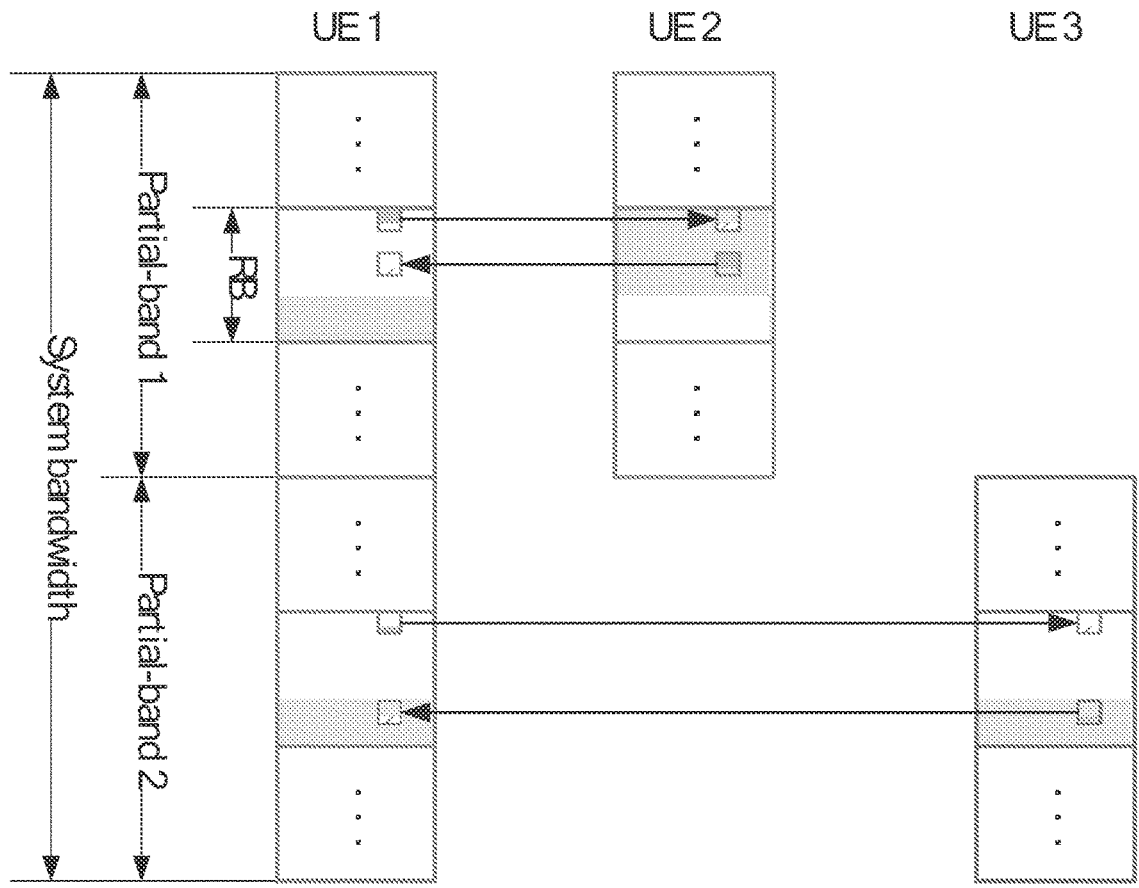
FIG. 9 illustrates an example of NR system bandwidth usage by one or more UEs and RE mapping, in accordance with aspects of the present disclosure.

However, as shown for example in FIG. 9, one or more UEs may only be operating on a partial-band (PB) and not the full 100) MHz system bandwidth. According to one or more cases, for example, a 100 MHz system bandwidth may be divided into multiple 20 MHz partial-bands. Some UEs may operate on one of these partial-bands, while some UEs may operate on multiple partial-bands.

For example, looking at FIG. 9, UE1 is shown operating on both partial-band 1 and partial-band 2, while UE2 operates on partial-band 1 and UE3 operates on partial-band 2. Accordingly, it can be appreciated that subband-set dependent PDSCH RE mapping may be provided to address this multiple UEs and partial-bands usage scenario. Particularly, PDSCH RE mapping may be provided to avoid partial-band aperiodic CSI-RSs for partial-bands where more than one UE is operating.

Further, according to one or more cases, CSI-RS may be transmitted over the partial-band configured for a UE in an NR system as opposed to an LTE system where the CSI-RS is transmitted across the whole system bandwidth. In one or more cases, one or more UE-specific configuration of NR CSI-RS may be used. For example, one or more examples of configuration that may be supported includes wideband CSI-RS, i.e. from UE perspective, the full bandwidth the UE is configured to operate with; partial-band CSI-RS, i.e. from UE perspective, part of the bandwidth the UE is configured to operate with; and different patterns may be used for wideband and subband CSI-RSs.

In one or more cases, PUSCH RE mapping may be provided to avoid subband aperiodic SRS and/or physical uplink control channel (PUCCH). For example, in LTE, the uplink waveform may be DFT-S-OFDM and in NR, CP-OFDM and DFT-S-OFDM based waveforms can be used in uplink. Further, SRS/PUCCH may be multiplexed with PUSCH in time-frequency and SRS/PUCCH may be transmitted aperiodically on a subband or partial-band with or without frequency hopping. Accordingly, PUSCH mapping to the RB assigned for transmission should avoid the REs used for uplink RSs and/or channels, e.g., SRS, PTRS, PUCCH, etc., and particularly for CP-OFDM based uplink.

Example of Method for Indicating PDSCH/PUSCH Resource Element Mapping

In accordance with one or more aspects of embodiments disclosed herein, a method for indicating data channel resource element mapping is provided. For example, PDSCH mapping to an RB assigned for transmission should avoid the REs used for RSs. For a subband set on which its PDSCH is scheduled, a UE is indicated with a set of REs which shall not be used for PDSCH mapping. Unlike periodic CSI-RS which can be configured via RRC messaging, aperiodic CSI-RS may be dynamically indicated to a specific UE via a dedicated DCI. A UE may be aware of the appearance of aperiodic CSI-RS transmissions for other UEs. In NR, the system bandwidth for a carrier can be much larger than that of LTE. For example, for sub-6 GHz carrier frequency, the system bandwidth can be up to 100 MHz, while a NR UE may be operating on a fraction of the whole system bandwidth. Hence, the CSI-RS transmission may only be on part of the bandwidth. The partial-band aperiodic CSI-RS transmission results in more sophisticated PDSCH RE mapping. For example, for a UE operating across multiple partial-bands, different PDSCH RE mapping patterns may be needed to avoid different aperiodic CSI-RS REs on each partial-band.

Figure 10:
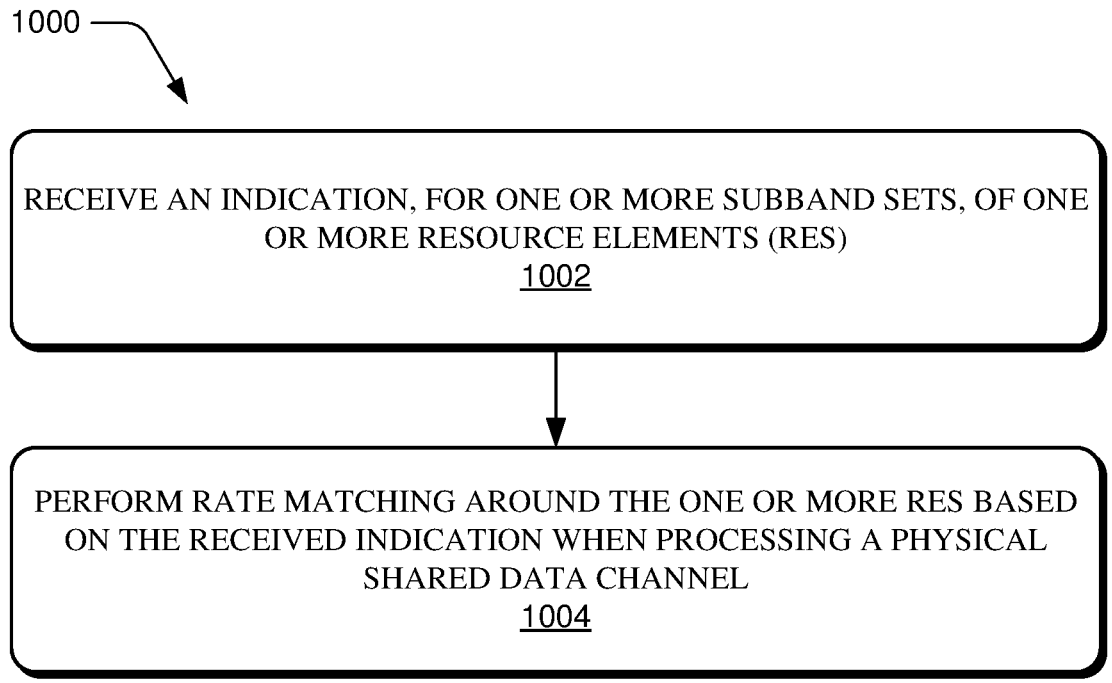
FIG. 10 illustrates example operations for wireless communications by a user equipment (UE), in accordance with aspects of the present disclosure.
Figure 10A:
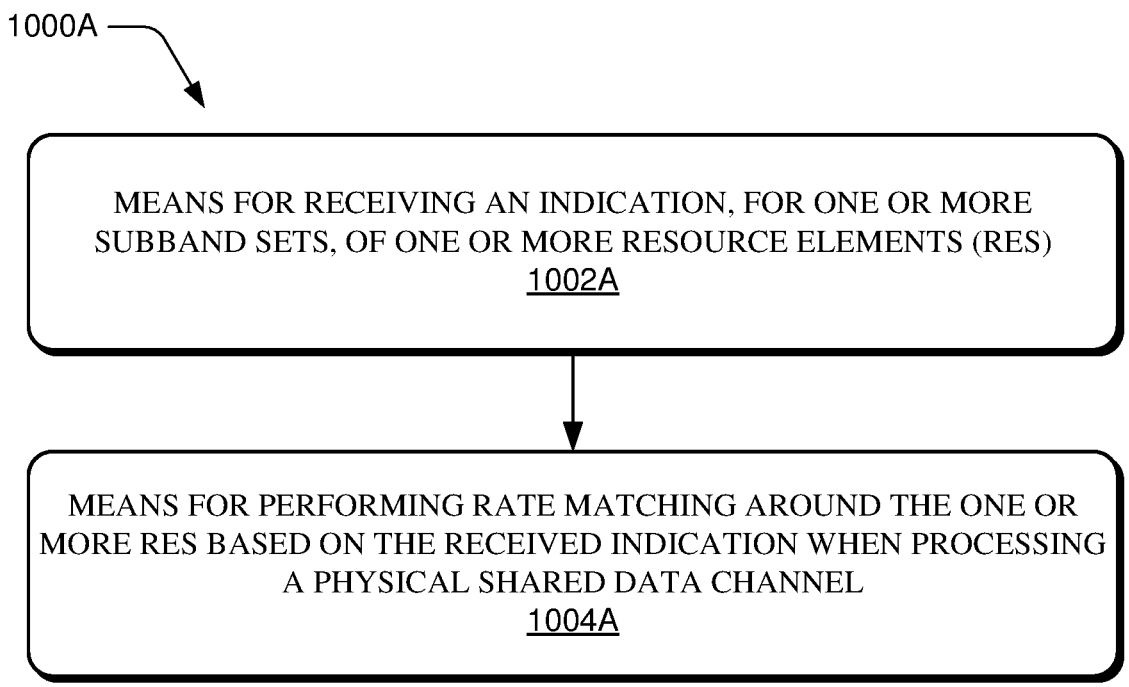
FIG. 10A illustrates components capable of performing the operations shown in FIG. 10, in accordance with certain aspects of the present disclosure.

For example, FIG. 10 illustrates operations for wireless communications by a user equipment (UE), in accordance with aspects of the present disclosure. Specifically, operations 1000 begin, at block 1002, with the UE receiving an indication, for one or more subband sets, of one or more resource elements (REs). The operations 1000 also include, at block 1004, performing rate matching around the one or more REs based on the received indication when processing a physical shared data channel.

Figure 11:
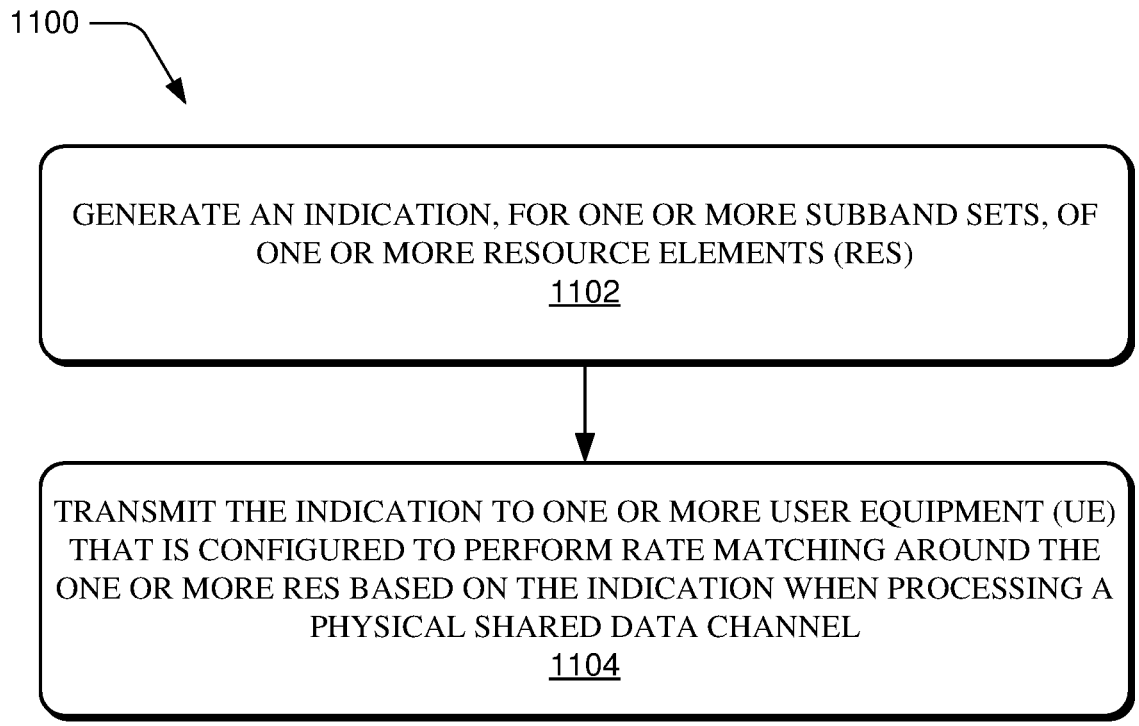
FIG. 11 illustrates example operations for wireless communications by a base station (BS), in accordance with aspects of the present disclosure.
Figure 11A:
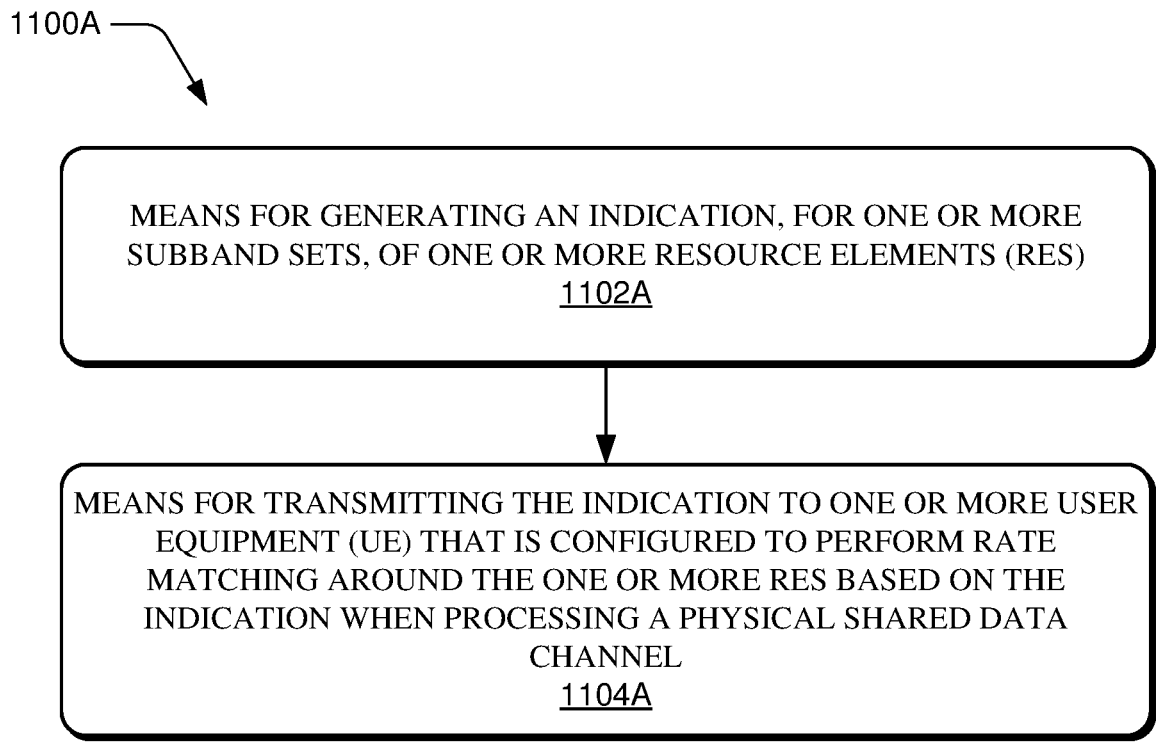
FIG. 11A illustrates components capable of performing the operations shown in FIG. 11, in accordance with certain aspects of the present disclosure.

FIG. 11 illustrates example operations for wireless communications by a base station (BS), in accordance with aspects of the present disclosure. Specifically, operations 1100 begin, at block 1102, with generating an indication, for one or more subband sets, of one or more resource elements (REs). The operations 1100 also include, at block 1104, transmitting the indication to one or more user equipment (UEs) that is configured to perform rate matching around the one or more REs based on the indication when processing a physical shared data channel.

Figure 12:
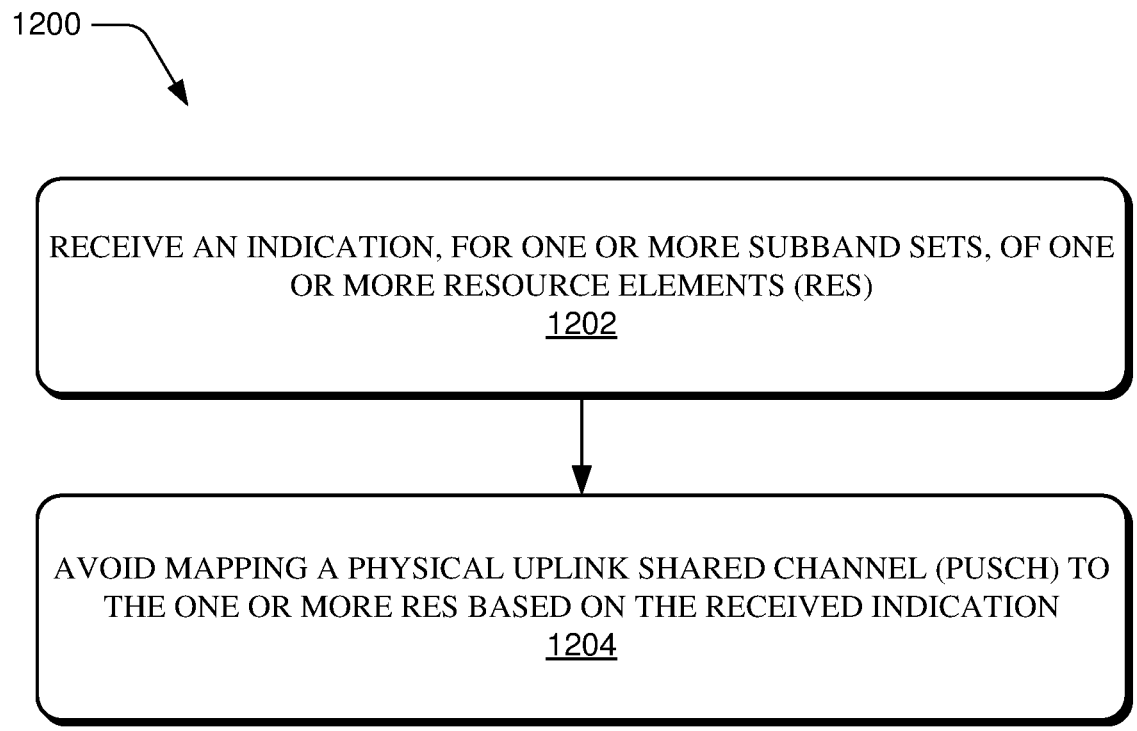
FIG. 12 illustrates example operations for wireless communications by a user equipment (UE), in accordance with aspects of the present disclosure.
Figure 12A:
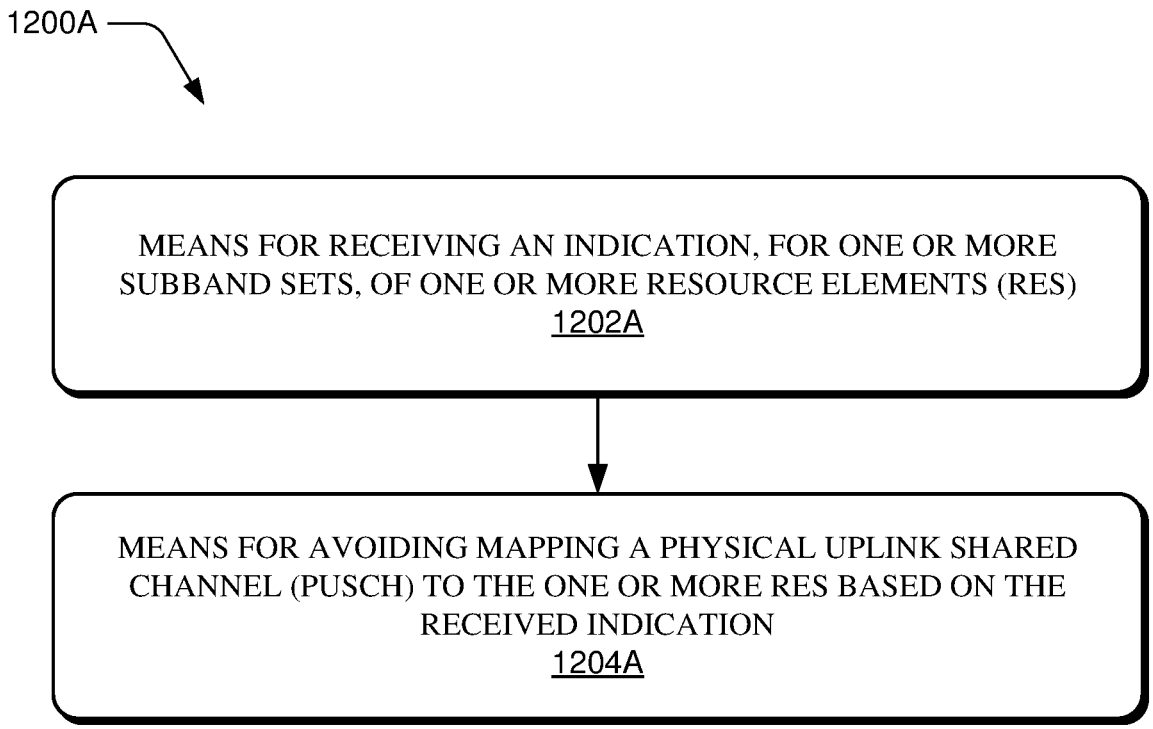
FIG. 12A illustrates components capable of performing the operations shown in FIG. 12, in accordance with certain aspects of the present disclosure.

FIG. 12 illustrates example operations for wireless communications by a user equipment (UE), in accordance with aspects of the present disclosure. Specifically, operations 1200 begin, at block 1202, with receiving an indication, for one or more subband sets, of one or more resource elements (REs). The operations 1200 also include, at block 1204, avoiding mapping a physical uplink shared channel (PUSCH) to the one or more REs based on the received indication.

Figure 13:
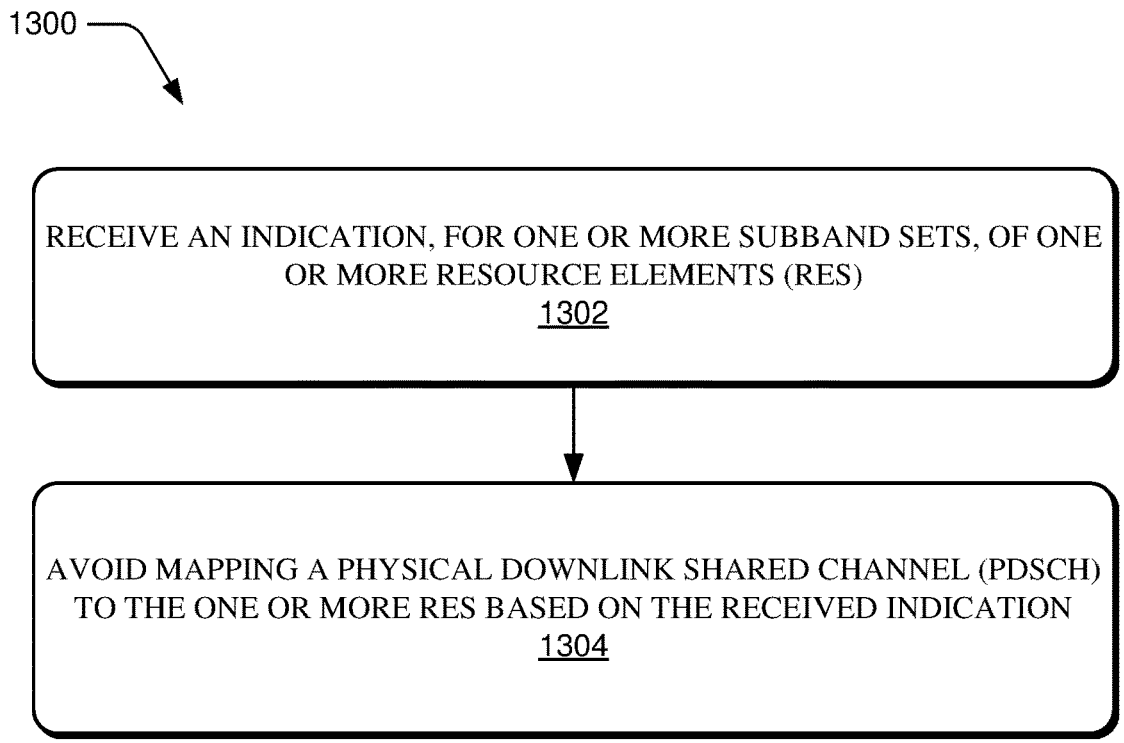
FIG. 13 illustrates example operations for wireless communications by a user equipment (UE), in accordance with aspects of the present disclosure.
Figure 13A:
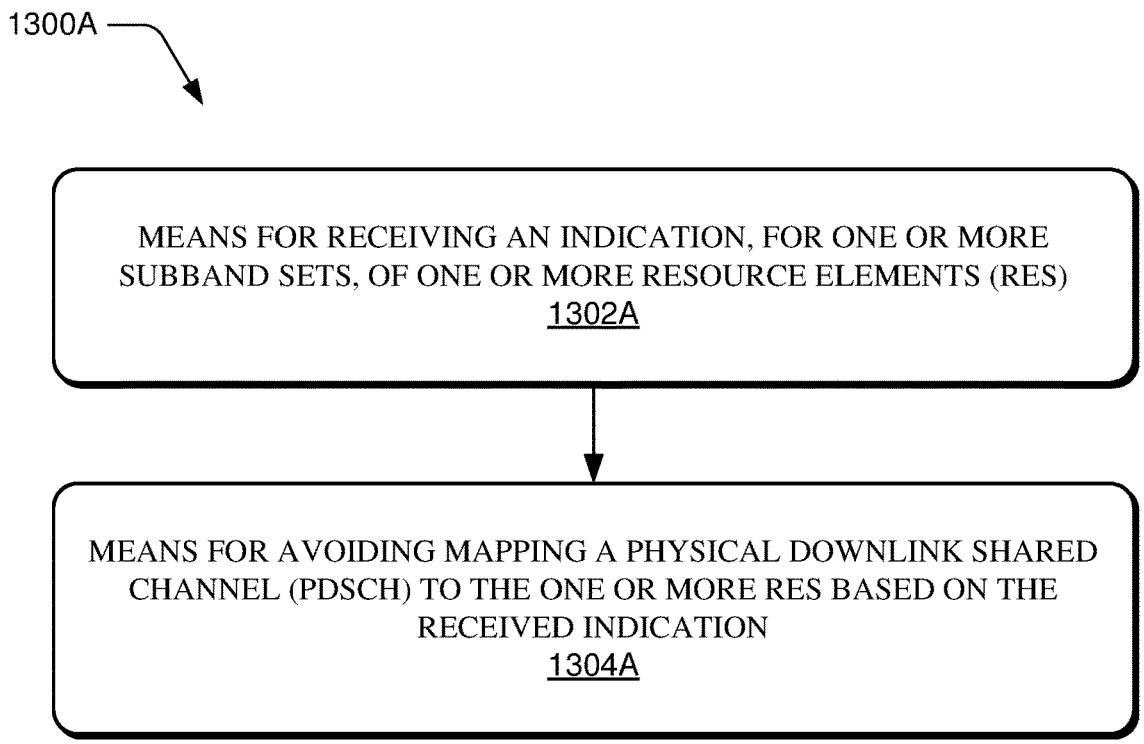
FIG. 13A illustrates components capable of performing the operations shown in FIG. 13, in accordance with certain aspects of the present disclosure.

FIG. 13 illustrates example operations for wireless communications by a user equipment (UE), in accordance with aspects of the present disclosure. Specifically, operations 1300 begin, at block 1302, with receiving an indication, for one or more subband sets, of one or more resource elements (REs). The operations 1300 also include, at block 1304, avoiding mapping a physical downlink shared channel (PDSCH) to the one or more REs based on the received indication.

Figure 14:
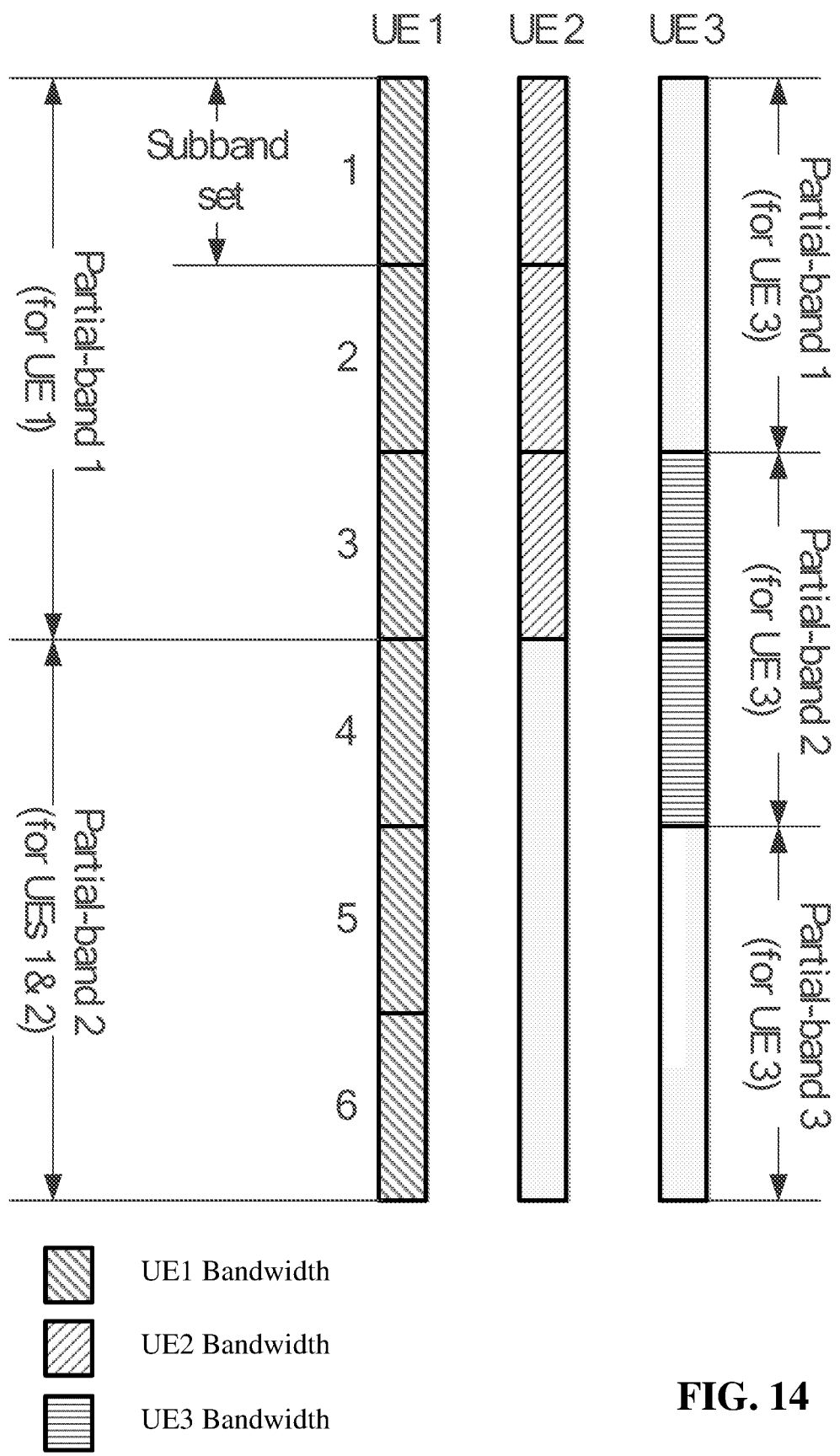
FIG. 14 illustrates an example of bandwidth usage by one or more UEs, in accordance with aspects of the present disclosure.

In one or more cases, PDSCH RE mapping via aperiodic indication of subband set dependent ZP REs may be provided in accordance with one or more cases. Particularly, for a subband set on which a UE's PDSCH is scheduled, the UE may receive an indication of a set of REs, which may also be called rate-matching REs (RMREs), that the REs may not be assumed for PDSCH mapping. These RMREs may be indicated as ZP CSI-RS resources and/or interference measurement resources (IMRs). For each subband set, one or more RMREs may be indicated. Accordingly, in this example, a per subband set indication may be provided rather than a per partial band indication. For example, as shown in FIG. 14, for UE 1, subband sets 2 and 3 belong to the same partial-band 1. However, different PDSCH rate-matching patterns are provided because the partial-band for UE 1 is partially overlapped with that for UE 3 (subband set 3).

In one or more cases, for a collection of subband sets, a common set of REs can be indicated, for example, subband sets 1 and 2 for a UE 1. In one or more cases, a subband set can be a single partial-band or a fraction of a partial-band. In one or more cases, a subband set may be fixed and may be dependent on system or UE bandwidth and/or carrier frequency. The partial-band may or may not be defined separately for different UEs.

Looking at FIG. 14, the areas without cross hatching represent portions that a UE is not configured to operate on for that part of bandwidth. For example, as shown, UE2 is not configured to operate in any part of partial-band 2. Further, UE3 is configured to operate only using subband sets 3 and 4 which correspond to a sub-portion of partial-band 1 and partial-band 2, respectively.

Figure 15:
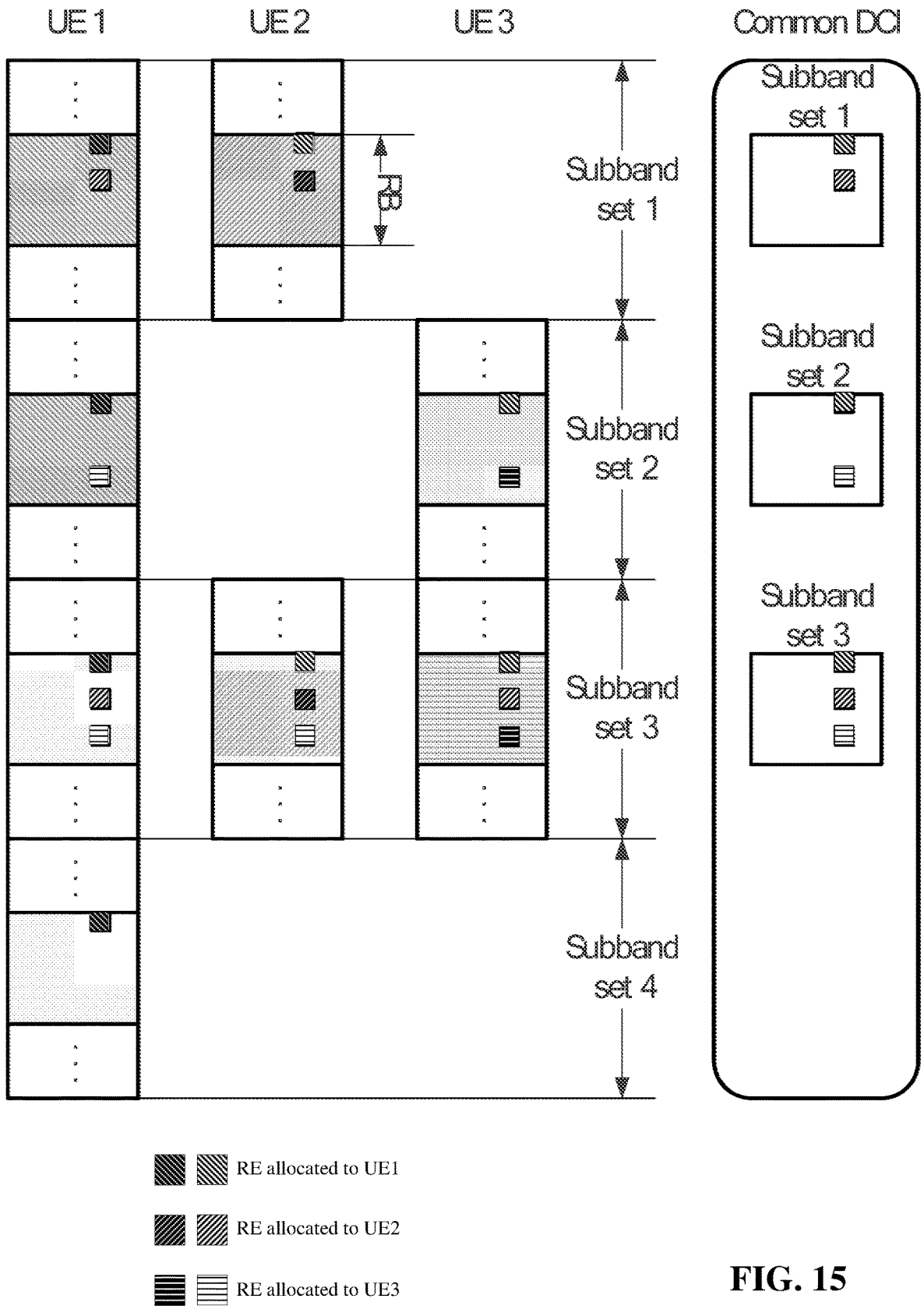
FIG. 15 illustrates an example of resource allocation including subband usage and RE mapping by one or more UEs, in accordance with aspects of the present disclosure.
Figure 16:
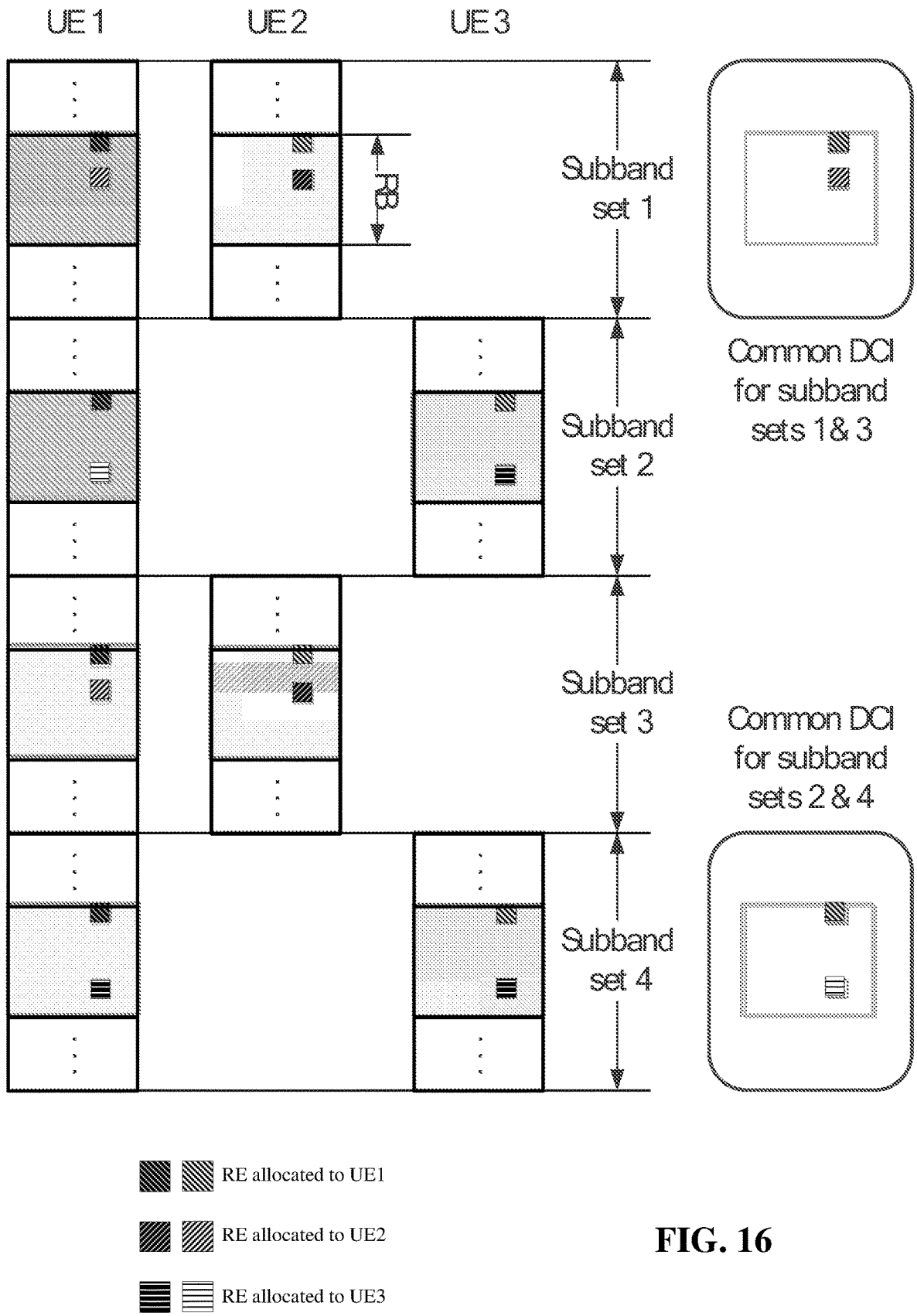
FIG. 16 illustrates another example of resource allocation including subband usage and RE mapping by one or more UEs, in accordance with aspects of the present disclosure.

According to one or more cases, as shown in FIGS. 15 and 16, a subband set dependent RMREs can be indicated to a group of UEs via common DCI(s). Further, a UE can figure out its own RMREs based on the resource allocation (RA) in the UE's PDSCH or PUSCH assignment. These are two examples of a group common indication. This means that the subband sets and the RMRE may be indicated by using group common DCI.

Looking specifically at FIG. 15, an example of resource allocation including subband usage and RE mapping by one or more UEs, in accordance with aspects of the present disclosure is shown. Particularly, a DCI is shown that contains the RMREs for all subband sets in the whole system. The DCI includes the RMRE definition for each of the subband sets 1, 2, and 3. In this example, there is no RMRE indication for subband set #4, because only one UE is scheduled for subband set #4. According to another example, a RMRE definition for subband set 4 may be included in the common DCI.

In comparison, FIG. 16 illustrates another example of resource allocation including subband usage and RE mapping by one or more UEs, in accordance with aspects of the present disclosure. Particularly, FIG. 16 shows one or more DCI(s). Each of these one or more DCI(s) may contain the RMREs for the subband sets associated with the DCI. In this example, one or more common DCIs may be transmitted. The first common DCI may be applied to subband sets 1 and 3 because they are using the same rate matching pattern. The second common DCI may be applied to subband set 2 and 4.

Figure 17:
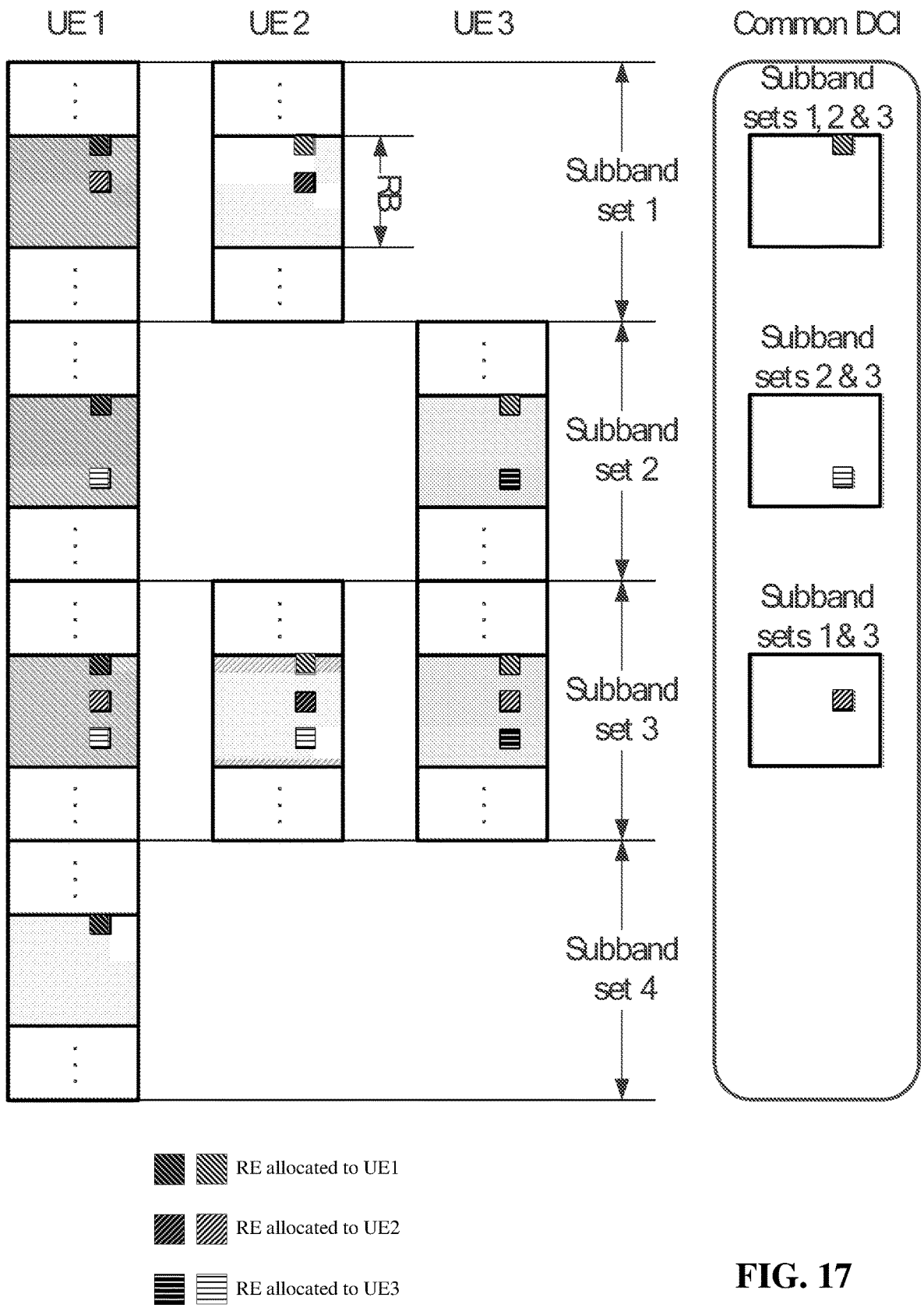
FIG. 17 illustrates another example of resource allocation including subband usage and RE mapping by one or more UEs, in accordance with aspects of the present disclosure.

For both cases shown in FIG. 15 and FIG. 16, the indication can be provided in a number of different formats. For example, the indication may be provided in one out of the following two alternative formats. A first format as shown in both FIG. 15 and FIG. 16 may include, for each subband set, a set of RMREs are indicated. A second format shown in FIG. 17 includes multiple RMREs being indicated, where each RMRE is associated with a collection of subband sets.

In one or more cases, the collection of contiguous subband sets can be indicated by at least one of: the index of a partial-band which contains all subband sets in the collection; the indices of the first and last subband sets; or the index of the first subband set and the number of subband sets. According to one or more cases, the collection of non-contiguous subband set can be indicated by a bitmap of subband sets in the system bandwidth or partial-band. In one or more cases, a combination of the examples shown in FIG. 15 and FIG. 16 along with the first and second formats shown in FIGS. 15-17 can be distinguished in terms of DCI format or a dedicated field in the DCI.

According to one or more cases, a dedicated indication may be provided. For example, the subband set dependent RMREs may be indicated to a UE via one or more dedicated DCI(s), for that particular UE. According to one or more examples, the dedicated indication may be indicated by a field in the DCI indicating DL grant or UL grant. According to another case, the dedicated indication of the subband set dependent RMREs may be indicated in a separate DCI which is referenced by the DCI indicating DL grant or UL grant. Similar to the examples shown in FIGS. 15 and 16 and discussed above, for both options, the dedicated indication can be in one out of the two alternative formats.

RMREs for a UE can be indicated by resource settings and entities. The resource setting and entities may include, for example, one or more indices of resource settings, one or more indices of CSI-RS resource sets, and/or one or more indices of CSI-RS resources.

According to one or more cases, a UE may be further indicated with associations between above indices and corresponding subband sets/partial-bands. For example, a UE may be indicated with multiple pairs of a CSI-RS resource and a bitmap of subband sets. The CSI-RS REs in a pair may be assumed to be RMREs on the subband sets indicated by the associated bitmap.

According to one or more cases, the embodiments discussed above with reference to at least FIGS. 14-17 may also be applied to PUSCH. For example, RMREs for a UE can be indicated by an SRS-like structure. The UE can be configured w/ one or more ZP SRS resources. Further, one or more ZP SRS resource indicators (SRIs) may be signaled to a UE for PUSCH RE mapping. The REs in the indicated ZP SRS resources may be rate-matched around. Further, according to one or more cases, the ZP SRS resource can be a NZP SRS resource for other UEs. Frequency hopping rules can be included in the ZP SRS resource configuration. A UE may assume that only the subband or subband set is activated for PUSCH RE mapping in a given slot based on the frequency hopping rules associated with the indicated ZP SRS configuration.

Further, according to one or more cases, RMREs for a UE may be indicated by PUCCH. Additionally, RMREs can be indicated by a combination of PUCCH and SRS-like structure.

According to one or more aspects, one or more REs for a subband set may be defined for all RBs within the subband set. Accordingly, an RMRE pattern may, for example, apply to each RB in the subband set, where the RMRE pattern defines the REs for a subband set for each RB in the subband. Further, in one or more cases, the RMRE pattern may be repeated on every RB in the subband set.

In one or more aspects, one or more REs for a subband set can be defined for a subset of RBs within the subband set. For example, an RMRE pattern may apply to a subset of RBs that includes only odd RBs in the subband set. Accordingly, the RMRE pattern would not apply to another subset of RBs such as even RBs in the subband set. According to another example, the RMRE pattern may be defined for a subset of RBs that includes every two RBs. In other example, the RMRE pattern applies to a subset that includes every other RB. This subset approach may be useful when the RS density is reduced by decimating k RBs every n RBs.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000, 1100, 1200, and 1300 illustrated in FIGS. 10, 11, 12, and 13 correspond to means 1000A. 1100A, 1200A, and 1300A, illustrated in FIGS. 10A, 11A, 12A, and 13A.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively. or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory). EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   receiving an indication, for one or more subband sets, of one or more resource elements (REs), wherein the one or more REs include a common set of REs for a collection of subband sets; and
   performing rate matching around the one or more REs based on the received indication when processing a physical shared data channel.

2. The method of claim 1, wherein the physical shared data channel is a physical downlink shared channel (PDSCH).

3. The method of claim 2, wherein the one or more REs are indicated by at least one of channel state information reference signal (CSI-RS) resources and interference measurement resources (IMRs).

4. The method of claim 2, wherein the one or more REs are indicated by resource settings and entities that include at least one of one or more indices of resource settings, one or more indices of channel state information reference signal (CSI-RS) resource sets, or one or more indices of CSI-RS resources.

5. The method of claim 2, wherein:
   the UE can be configured with one or more resource settings;
   the one or more resource settings include one or more CSI-RS resource sets;
   the one or more CSI-RS resource sets contains one or more CSI-RS resources; and
   the indication includes at least one or more of resource setting indices; CSI-RS resource set indices; or CSI-RS resource indices.

6. The method of claim 1, wherein the physical shared data channel is a physical uplink shared channel (PUSCH).

7. The method of claim 6, wherein the one or more REs are indicated by at least one of sounding reference signal (SRS) resources and physical uplink control channel (PUCCH) structures.

8. The method of claim 6, wherein the one or more REs are indicated by sounding reference signal (SRS) resources that include at least one of one or more SRS resource indicators (SRIs), or physical uplink control channel (PUCCH) structure.

9. The method of claim 6, wherein the one or more REs are indicated using a sounding reference signal (SRS) resources.

10. The method of claim 9, further comprising performing rate matching around REs indicated within one or more zero power sounding reference signal (ZP SRS) resources.

11. The method of claim 10, wherein one or more of the ZP SRS resources are non-zero power sounding reference signal (NZP SRS) resources for other UEs, and wherein frequency hopping rules are included in a ZP SRS resource configuration.

12. The method of claim 1, wherein the one or more REs are indicated via downlink control information (DCI).

13. The method of claim 12, wherein the DCI is a common DCI which contains the indication of one or more resource elements (REs) for one or more subband sets.

14. The method according to claim 13, wherein the common DCI contains at least one bitmap which shows which REs are associated with which subband sets.

15. The method of claim 12, wherein the DCI contains the REs for all subband sets.

16. The method of claim 12, wherein the DCI contains the REs for one subband set.

17. The method of claim 12, wherein the one or more REs are indicated by a field in the DCI indicating downlink (DL) grant or uplink (UL) grant.

18. The method of claim 12, wherein the one or more REs are indicated in a separate DCI which is referenced by the DCI indicating DL grant or UL grant.

19. The method of claim 1, wherein the indication is formatted such that, for each subband set, a set of REs is indicated.

20. The method of claim 1, wherein:
the indication is formatted such that one or more REs are indicated, and
each of the one or more REs are associated with a collection of subband sets.

21. The method of claim 1, wherein the one or more REs are indicated by a physical uplink control channel (PUCCH) structure.

22. The method of claim 1, wherein the one or more REs are indicated by a combination of one or more SRS resources and one or more PUCCH structure.

23. The method in claim 1, wherein the one or more REs for a subband set can be defined for all RBs within the subband set.

24. The method in claim 1, wherein the one or more REs for a subband set can be defined for a subset of RBs within the subband set.

25. A method of wireless communications by a base station (BS), comprising:
generating an indication, for one or more subband sets, of one or more resource elements (REs), wherein the one or more REs include a common set of REs for a collection of subband sets; and
transmitting the indication to one or more user equipment (UE) that is configured to perform rate matching around the one or more REs based on the indication when processing a physical shared data channel.

26. A method of wireless communication by a user equipment (UE), comprising:
receiving an indication, for one or more subband sets, of one or more resource elements (REs), wherein the one or more REs include a common set of REs for a collection of subband sets; and
avoiding mapping a physical uplink shared channel (PUSCH) to the one or more Res based on the received indication.

27. A method of wireless communication by a user equipment (UE), comprising:
receiving an indication, for one or more subband sets, of one or more resource elements (REs), wherein the one or more REs include a common set of REs for a collection of subband sets; and
avoiding mapping a physical downlink shared channel (PDSCH) to the one or more REs based on the received indication.

28. The method according to claim 27, wherein the indication contains the one or more resource elements (REs) used for reference signals in subband sets.

29. An apparatus for wireless communication, comprising:
means for receiving an indication, for one or more subband sets, of one or more resource elements (REs), wherein the one or more REs include a common set of REs for a collection of subband sets; and
means for performing rate matching around the one or more REs based on the received indication when processing a physical shared data channel.

30. The apparatus of claim 29, wherein the physical shared data channel is a physical downlink shared channel (PDSCH).

31. The apparatus of claim 30, wherein the one or more REs are indicated by at least one of channel state information reference signal (CSI-RS) resources and interference measurement resources (IMRs).

32. The apparatus of claim 30, wherein the one or more REs are indicated by resource settings and entities that include at least one of one or more indices of resource settings, one or more indices of channel state information reference signal (CSI-RS) resource sets, or one or more indices of CSI-RS resources.

33. The apparatus of claim 30, wherein:
the UE can be configured with one or more resource settings;
the one or more resource settings include one or more CSI-RS resource sets;
the one or more CSI-RS resource sets contains one or more CSI-RS resources; and
the indication includes at least one or more of resource setting indices; CSI-RS resource set indices; or CSI-RS resource indices.

34. The apparatus of claim 29, wherein the physical shared data channel is a physical uplink shared channel (PUSCH).

35. The apparatus of claim 34, wherein the one or more REs are indicated by at least one of sounding reference signal (SRS) resources and physical uplink control channel (PUCCH) structures.

36. The apparatus of claim 34, wherein the one or more REs are indicated by sounding reference signal (SRS) resources that include at least one of one or more SRS resource indicators (SRIs), or physical uplink control channel (PUCCH) structure.

37. The apparatus of claim 34, wherein the one or more REs are indicated using a sounding reference signal (SRS) resources.

38. The apparatus of claim 37, further comprising:
means for performing rate matching around REs indicated within one or more sounding reference signal (SRS) resources.

39. The apparatus of claim 38, wherein one or more of the ZP SRS resources are non-zero power sounding reference signal (NZP SRS) resources for other UEs, and wherein frequency hopping rules are included in a ZP SRS resource configuration.

40. The apparatus according to claim 39, wherein the indication contains the one or more resource elements (REs) used for reference signals in subband sets.

41. The apparatus of claim 29, wherein the one or more REs are indicated via downlink control information (DCI).

42. The apparatus of claim 41, wherein the DCI is a common DCI which contains the indication of one or more resource elements (REs) for one or more subband sets.

43. The apparatus according to claim 42, wherein the common DCI contains at least one bitmap which shows which REs are associated with which subband sets.

44. The apparatus of claim 41, wherein the DCI contains the REs for all subband sets.

45. The apparatus of claim 41, wherein the DCI contains the REs for one subband set.

46. The apparatus of claim 41, wherein the one or more REs are indicated by a field in the DCI indicating downlink (DL) grant or uplink (UL) grant.

47. The apparatus of claim 41, wherein the one or more REs are indicated in a separate DCI which is referenced by the DCI indicating DL grant or UL grant.

48. The apparatus of claim 29, wherein the indication is formatted such that, for each subband set, a set of REs is indicated.

49. The apparatus of claim 29, wherein:
the indication is formatted such that one or more REs are indicated, and
each of the one or more REs are associated with a collection of subband sets.

50. The apparatus of claim 29, wherein the one or more REs are indicated by a physical uplink control channel (PUCCH) structure.

51. The apparatus of claim 29, wherein the one or more REs are indicated by a combination of one or more SRS resources and one or more PUCCH structure.

52. An apparatus for wireless communications, comprising:
- means for generating an indication, for one or more subband sets, of one or more resource elements (REs), wherein the one or more REs include a common set of REs for a collection of subband sets; and
- means for transmitting the indication to one or more user equipment (UE) that is configured to perform rate matching around the one or more REs based on the indication when processing a physical shared data channel.

53. An apparatus for wireless communication, comprising:
- means for receiving an indication, for one or more subband sets, of one or more resource elements (REs), wherein the one or more REs include a common set of REs for a collection of subband sets; and
- means for avoiding mapping a physical uplink shared channel (PUSCH) to the one or more Res based on the received indication.

54. An apparatus for wireless communication, comprising:
- means for receiving an indication, for one or more subband sets, of one or more resource elements (REs), wherein the one or more REs include a common set of REs for a collection of subband sets; and
- means for avoiding mapping a physical downlink shared channel (PDSCH) to the one or more REs based on the received indication.

\* \* \* \* \*